UNITED STATES PATENT OFFICE.

NESTOR LATTARD, OF NEW YORK, N. Y.

FOOD COMPOUND.

No. 826,175.　　　Specification of Letters Patent.　　　Patented July 17, 1906.

Application filed June 5, 1903. Serial No. 160,180.

*To all whom it may concern:*

Be it known that I, NESTOR LATTARD, a citizen of the United States, and a resident of the borough of Manhattan, in the city and State of New York, have invented a new and useful Food Compound, of which the following is a specification.

My invention relates to a food compound in the nature of a sauce or relish for use as an appetizer, the object being to provide a healthful and stable sauce agreeable to the taste.

With these ends in view my invention consists of a mixture of Worcestershire sauce, tarragon-vinegar, currant-jelly, chilli-sauce, and Harvey sauce.

The sauce is made in the following manner, the parts of each ingredient being by weight and the stated quantities of each ingredient being that preferred, although it is to be understood that reasonable variations in the relative quantities may be made without departing from the spirit and scope of my invention: Mix at ordinary temperatures five (5) parts of Worcestershire sauce, three (3) parts of tarragon-vinegar, three (3) parts of currant-jelly, four (4) parts of chilli-sauce, and one (1) part of Harvey sauce. Stir the mixture until the several ingredients have been thoroughly incorporated and distributed as far as possible homogeneously throughout the mass, and then strain through a fine-mesh metallic or cloth strainer and bottle or store in some suitable vessel, to be served cold with meats, fish, and game as may be desired.

The product has been found to be a very healthful and appetizing sauce and is sufficiently liquid to be poured freely over the meat or other article of food with which it is used. The several sauces noted as Worcestershire, chilli, and Harvey are sauces which are well known to the trade by the names indicated, while tarragon-vinegar is a white-wine vinegar with tarragon in it to flavor it. Chemically considered, this sauce differs essentially from other ready-made sauces prepared for the table, since it contains about ten per cent. of sugar and also fruit-acids. Aside from these substances it contains extracts of various condiments or natural spices in a weak or diluted vinegar.

Sauces for the table should be so composed that they possess a considerable degree of stability. They should not suffer by exposure to the air and should be inert to infection by germs. While this has hitherto been commonly accomplished by the exclusion of such substances as sugar, which easily ferments, this sauce contains a considerable quantity of sugar, and this sugar is absolutely sterilized and solely by the presence of extracts of ordinary condiments or spices. A careful chemical analysis shows that such preservatives as salicylic acid, the naphtholes and borates, which are known to have been used in the industries, are wholly absent from this sauce. The flavor of the sauce is a carefully-blended one and contains but small quantities of each of the several substances which serve to preserve it; but the sum-total of all of these preservative condiments or spices serves its purpose perfectly.

The aforesaid chemical analysis shows that the substances relied upon to preserve the sauce are phenol-like substances, as eugenol as it is present in cloves and pimentum, and aldehydes as they occur in cinnamon-bark, fructus amomi and cardamoms, and tannins as they occur in nuts and allspice. It also contains some horseradish and vinegar, the latter partly as condiment and partly to render many of the active principles of the spices more soluble, and hence more active. Peppers are also present. The sugar materially improves the taste of the sauce, and as it is prevented by the other ingredients from fermentation the sauce becomes not only pleasant and agreeable to the taste, but stable as well.

What I claim is—

A food compound composed of Worcestershire sauce, tarragon-vinegar, currant-jelly, chilli-sauce and Harvey sauce, in the proportions substantially as specified.

In testimony that I claim the foregoing as my invention I have signed my name, in presence of two witnesses, this 4th day of June, 1903.

NESTOR LATTARD.

Witnesses:
　FREDK. HAYNES,
　HENRY THIEME.